United States Patent
Kwon et al.

(10) Patent No.: US 10,037,847 B2
(45) Date of Patent: Jul. 31, 2018

(54) APPARATUS AND METHOD FOR WIRELESSLY RECEIVING POWER

(71) Applicant: SAMSUNG ELECTRONICS CO., LTD., Suwon-si (KR)

(72) Inventors: Ui Kun Kwon, Hwaseong-si (KR); Sang Joon Kim, Hwaseong-si (KR); Seung Keun Yoon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 638 days.

(21) Appl. No.: 13/940,695

(22) Filed: Jul. 12, 2013

(65) Prior Publication Data

US 2014/0028107 A1    Jan. 30, 2014

(30) Foreign Application Priority Data

Jul. 25, 2012 (KR) .................. 10-2012-0081195

(51) Int. Cl.

| | |
|---|---|
| *H01F 27/42* | (2006.01) |
| *H01F 37/00* | (2006.01) |
| *H01F 38/00* | (2006.01) |
| *H01F 38/14* | (2006.01) |
| *H02J 50/80* | (2016.01) |
| *H02J 50/40* | (2016.01) |
| *H02J 50/12* | (2016.01) |
| *H02J 7/02* | (2016.01) |
| *H02J 5/00* | (2016.01) |

(52) U.S. Cl.
CPC .............. *H01F 38/14* (2013.01); *H02J 7/025* (2013.01); *H02J 50/12* (2016.02); *H02J 50/40* (2016.02); *H02J 50/80* (2016.02); *H02J 5/005* (2013.01)

(58) Field of Classification Search
CPC ...... B60L 11/007; G06K 7/0008; H02J 7/345; H02J 17/00; G06F 19/00; H01F 38/14; H04B 5/00; H04B 1/16; H04L 27/06; H04L 27/04
USPC .............. 307/104, 149, 66, 10.1, 64, 82, 80; 320/137, 104, 110, 109; 375/224, 225; 343/867, 850
See application file for complete search history.

(56) References Cited

U.S. PATENT DOCUMENTS

| | | | |
|---|---|---|---|
| 7,825,715 B1 | 11/2010 | Greenberg | |
| 8,487,480 B1 * | 7/2013 | Kesler | B60L 11/007 307/104 |

(Continued)

FOREIGN PATENT DOCUMENTS

| | | | |
|---|---|---|---|
| JP | 07-095030 A | 4/1995 | |
| JP | 09-326736 A | 12/1997 | |

(Continued)

OTHER PUBLICATIONS

Korean Office Action dated Mar. 12, 2018 in corresponding Korean Patent Application No. 10-2012-0081195 (6 pages in English and 6 pages in Korean).

*Primary Examiner* — Rexford Barnie
*Assistant Examiner* — Jagdeep Dhillon
(74) *Attorney, Agent, or Firm* — NSIP Law

(57) ABSTRACT

A wireless power receiver includes a receiving unit configured to wirelessly receive power through a resonance between a source resonator and a target resonator. The wireless power receiver further includes a control unit configured to connect the target resonator to at least one capacitor to control a range of a voltage output from the target resonator.

21 Claims, 23 Drawing Sheets

(56) References Cited

U.S. PATENT DOCUMENTS

| | | | |
|---|---|---|---|
| 8,754,610 B2* | 6/2014 | Garcia | H02J 7/345 320/110 |
| 2002/0079946 A1 | 6/2002 | Lee et al. | |
| 2006/0097797 A1 | 5/2006 | Gomez | |
| 2009/0284227 A1* | 11/2009 | Mohammadian | G06K 7/0008 320/137 |
| 2010/0259108 A1 | 10/2010 | Giler et al. | |
| 2010/0295379 A1 | 11/2010 | Garcia | |
| 2011/0095618 A1* | 4/2011 | Schatz | H03H 7/40 307/104 |
| 2011/0266880 A1* | 11/2011 | Kim | H02J 50/12 307/104 |
| 2012/0248890 A1* | 10/2012 | Fukushima | H02J 5/005 307/104 |
| 2012/0299557 A1* | 11/2012 | Kwon | H02J 5/005 320/166 |
| 2012/0309304 A1* | 12/2012 | Kim | H04B 5/0031 455/41.1 |
| 2013/0200717 A1* | 8/2013 | Bourilkov | H02J 7/025 307/104 |

FOREIGN PATENT DOCUMENTS

| | | |
|---|---|---|
| JP | 10-201226 A | 7/1998 |
| JP | 2004-222249 A | 8/2004 |
| KR | 2002-0008746 A | 1/2002 |
| KR | 10-2007-0093218 A | 9/2007 |
| KR | 10-2009-0025960 A | 3/2009 |
| KR | 10-2011-0037728 A | 4/2011 |
| KR | 10-2011-0037999 A | 4/2011 |
| KR | 10-2011-0053487 A | 5/2011 |
| WO | WO 2007/148693 A1 | 12/2007 |

* cited by examiner

Full bridge rectified signal

APPARATUS AND METHOD FOR WIRELESSLY RECEIVING POWER

CROSS-REFERENCE TO RELATED APPLICATION

This application claims the benefit under 35 USC 119(a) of Korean Patent Application No. 10-2012-0081195, filed on Jul. 25, 2012, in the Korean Intellectual Property Office, the entire disclosure of which is incorporated herein by reference for all purposes.

BACKGROUND

1. Field

The following description relates to an apparatus and method for wirelessly receiving power.

2. Description of Related Art

Research on wireless power transmission has been started to overcome issues, such as an increasing inconvenience of wired power supply and limits to existing battery capacities, due to an increase in various electronic devices including mobile terminals. In particular, research has been concentrated on near-field wireless power transmission. The near-field wireless power transmission refers to an example in which a distance between a transmission coil and a reception coil is sufficiently short, compared to a wavelength in an operation frequency. A wireless power transmission and reception system using a resonance characteristic may include a source device configured to supply power, and a target device configured to receive the supplied power.

SUMMARY

In one general aspect, a wireless power receiver includes a receiving unit configured to wirelessly receive power through a resonance between a source resonator and a target resonator. The wireless power receiver further includes a control unit configured to connect the target resonator to at least one capacitor to control a range of a voltage output from the target resonator.

In another general aspect, a wireless power receiver includes a receiving unit configured to wirelessly receive power through a resonance between a source resonator and a target resonator. The wireless power receiver further includes a control unit configured to connect the target resonator to a passive device to control a range of a voltage output from the target resonator.

In still another general aspect, a wireless power reception method includes wirelessly receiving power through a resonance between a source resonator and a target resonator. The wireless power reception method further includes connecting the target resonator to at least one capacitor to control a range of a voltage output from the target resonator.

Other features and aspects will be apparent from the following detailed description, the drawings, and the claims.

DETAILED DESCRIPTION

Figure 1:
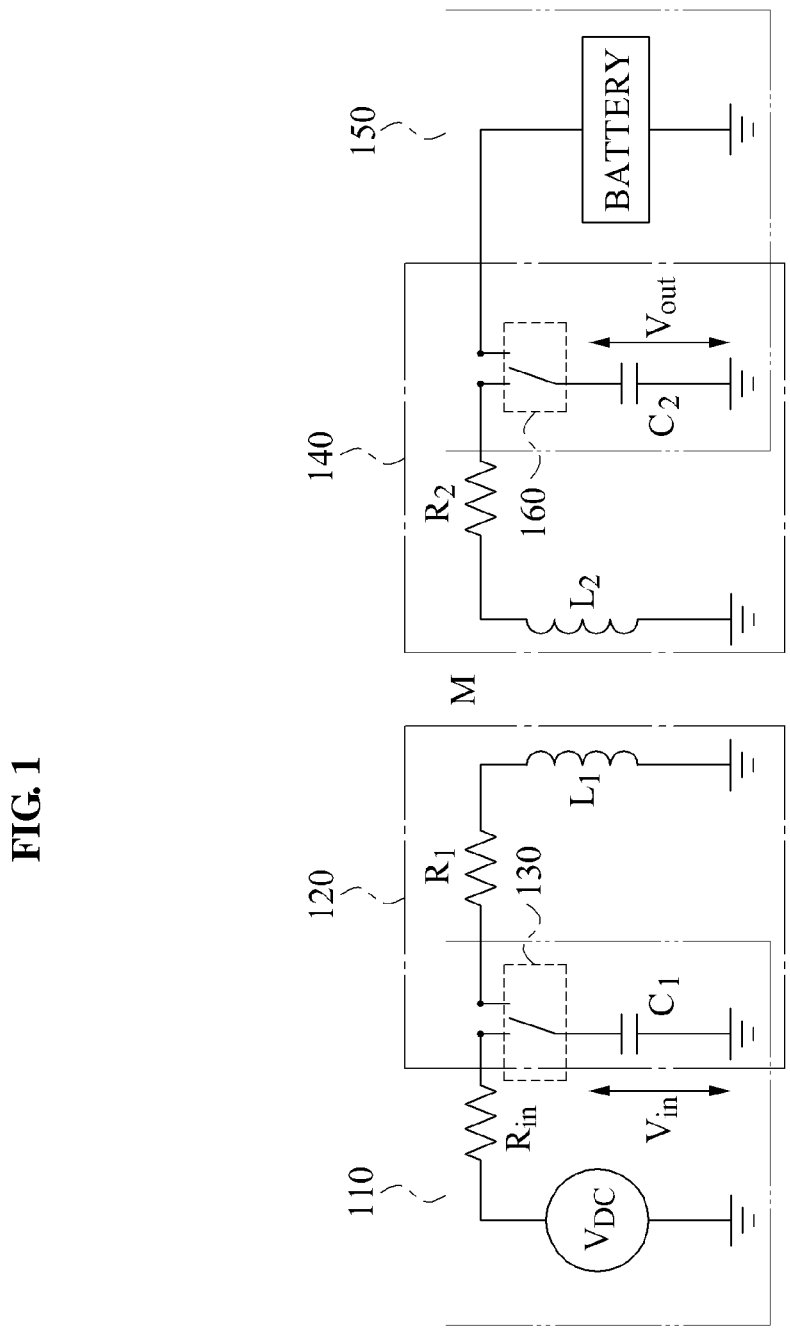
FIG. 1 is a diagram illustrating an example of an equivalent circuit of a wireless power transmission system.

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

A wireless power transmission system may be applied to various systems requiring wireless power. The wireless power transmission system may be used in a system enabling use of wireless power, for example, a mobile phone, a wireless television (TV), and/or other systems known to one of ordinary skill in the art. Additionally, the wireless power transmission system may be applicable in a bio-healthcare field, and may be used to remotely transmit power to a device inserted into a human body, or used to wirelessly transmit power to a bandage-shaped device for measurement of a heart rate.

Additionally, the wireless power transmission system may be used to remotely control an information storage device without a power source. The wireless power transmission system may be applied to a system configured to supply power to an information storage device to remotely operate the information storage device, and to wirelessly request information stored in the information storage device.

The wireless power transmission system may receive energy supplied from a power supply unit, and may store the energy in a source resonator, to generate a signal. The wireless power transmission system may induce the source resonator to self-resonate by powering off a switch that electrically connects the power supply unit to the source resonator. When a target resonator with the same resonant frequency as the self-resonating source resonator is disposed within a distance close enough to resonate with the source resonator, a mutual resonance phenomenon may occur between the source resonator and the target resonator. In examples herein, the source resonator may refer to a resonator that receives energy from a power supply unit, and the target resonator may refer to a resonator that receives energy from the source resonator due to the mutual resonance phenomenon.

FIG. 1 illustrates an example of an equivalent circuit of a wireless power transmission system. Referring to FIG. 1, the wireless power transmission system includes a source-target structure including a source device and a target device. The wireless power transmission system includes a wireless power transmitter corresponding to the source device, and a wireless power receiver corresponding to the target device.

In more detail, the wireless power transmitter includes a power input unit 110, a power transmitting unit 120, a switch unit 130, and a capacitor $C_1$. The power input unit 110 is physically-separated from the power transmitting unit 120 by the switch unit 130 and the capacitor $C_1$. The wireless power receiver includes a receiving unit 140, a power output unit 150, a switch unit 160, and a capacitor $C_2$. The receiving unit 140 is physically-separated from the power output unit 150 by the switch unit 160 and the capacitor $C_2$.

The power input unit 110 stores energy in the capacitor $C_1$, using a power supply unit generating an input voltage $V_{DC}$. The switch unit 130 connects the capacitor $C_1$ to the power input unit 110, while the energy is transmitted from the power supply unit and stored in the capacitor $C_1$. To discharge the stored energy, the switch unit 130 disconnects the capacitor $C_1$ from the power input unit 110, and connects the capacitor $C_1$ to the power transmitting unit 120. The switch unit 130 prevents the capacitor $C_1$ from being connected to the power input unit 110 and the power transmitting unit 120 at the same time.

The power transmitting unit 120 transfers electromagnetic energy to the receiving unit 140, through mutual resonance. In more detail, the power transmitting unit 120 transfers the electromagnetic energy through the mutual resonance between a transmission coil $L_1$ of the power transmitting unit 120 and a reception coil $L_2$ of the receiving unit 140. The level of the mutual resonance between the transmission coil $L_1$ and the reception coil $L_2$ is affected by mutual inductance M between the transmission coil $L_1$ and the reception coil $L_2$.

For example, the power transmitting unit 120 may quantize the electromagnetic energy stored in the capacitor $C_1$, and may transmit the quantized energy to the receiving unit 140 for a symbol unit. The power transmitting unit 120 may control different amounts of the electromagnetic energy to be transmitted to the receiving unit 140 for each symbol unit, and may also transmit information to the receiving unit 140. The symbol unit may be used to transfer the information in a single bit between the source device and the target device. The symbol unit refers to a period or cycle during which the charged capacitor $C_1$ is discharged through the mutual resonance between a source resonator (e.g., the power transmitting unit 120) and a target resonator (e.g., the receiving unit 140), based on an operation of the switch unit 130.

The power input unit 110 includes the power supply unit generating the input voltage $V_{DC}$, an internal resistor $R_{in}$, and the capacitor $C_1$, and the power transmitting unit 120 includes a resistor $R_1$, the transmission coil $L_1$, and the capacitor $C_1$ that form the source resonator. Additionally, the switch unit 130 includes at least one switch. For example, the switch may include an active element enabling an on/off function. In FIG. 1, $R_1$, $L_1$, and $C_1$ represent a resistance, an inductance, and a capacitance, respectively, of the source resonator. A voltage applied to the capacitor $C_1$ among the input voltage $V_{DC}$ is represented by $V_{in}$.

In FIG. 1, the receiving unit 140 receives the electromagnetic energy from the power transmitting unit 120, and stores the received electromagnetic energy in the capacitor $C_2$. The switch unit 160 connects the capacitor $C_2$ to the receiving unit 140, while the electromagnetic energy is transmitted from the power transmitting unit 120 and stored in the capacitor $C_2$. To discharge the stored energy, the switch unit 160 disconnects the capacitor $C_2$ from the receiving unit 140, and connects the capacitor $C_2$ to the power output unit 150. The power output unit 150 transfers the energy stored in the capacitor $C_2$ to a load, for example, a battery. The switch unit 160 prevents the capacitor $C_2$ from being connected to the receiving unit 140 and the power output unit 150 at the same time.

In more detail, the receiving unit 140 receives the electromagnetic energy through the mutual resonance between the reception coil $L_2$ of the receiving unit 140 and the transmission coil $L_1$ of the power transmitting unit 120. The receiving unit 140 charges the capacitor $C_2$ connected to the reception coil $L_2$, with the received electromagnetic energy. The power output unit 150 transfers the energy used to charge the capacitor $C_2$ to the load, for example, the battery. As another example, the power output unit 150 may transfer the energy to a target device requiring power, instead of to the battery.

For example, the receiving unit 140 may receive the electromagnetic energy from the power transmitting unit 120 for a symbol unit. The receiving unit 140 may further receive the information from the power transmitting unit 120, and may demodulate the information based on an amount of the received electromagnetic energy.

The receiving unit 140 includes a resistor $R_2$, the reception coil $L_2$, and the capacitor $C_2$ that form a target resonator, and the power output unit 150 includes the capacitor $C_2$ and the battery. The switch unit 160 includes at least one switch. In FIG. 1, $R_2$, $L_2$, and $C_2$ represent a resistance, an inductance, and a capacitance, respectively, of the target resonator. A voltage applied to the capacitor $C_2$ among the electromagnetic energy received by the reception coil $L_2$ is represented by $V_{out}$.

The above-described wireless power transmission system enables power to be wirelessly transmitted when the power input unit 110 is physically separated from the power transmitting unit 120, and the receiving unit 140 is physically separated from the power output unit 150. This wireless power transmission system is referred to as a Resonator Isolation (RI) system.

The RI system does not need a power amplifier because power may be supplied from a direct current (DC) source (e.g., the power supply unit generating the input voltage $V_{DC}$) directly to the source resonator. Further, the RI system does not require a rectifying operation of a rectifier because energy is captured from energy used to charge the capacitor $C_2$ of the wireless power receiver. Further, a transmission efficiency is not sensitive to a change in a distance between the wireless power transmitter and the wireless power receiver because there is no need to perform impedance matching. Additionally, the RI system may be easily extended from the wireless power transmission system including a single transmitter and a single receiver to a wireless power transmission system including a plurality of transmitters and a plurality of receivers.

Figure 2:
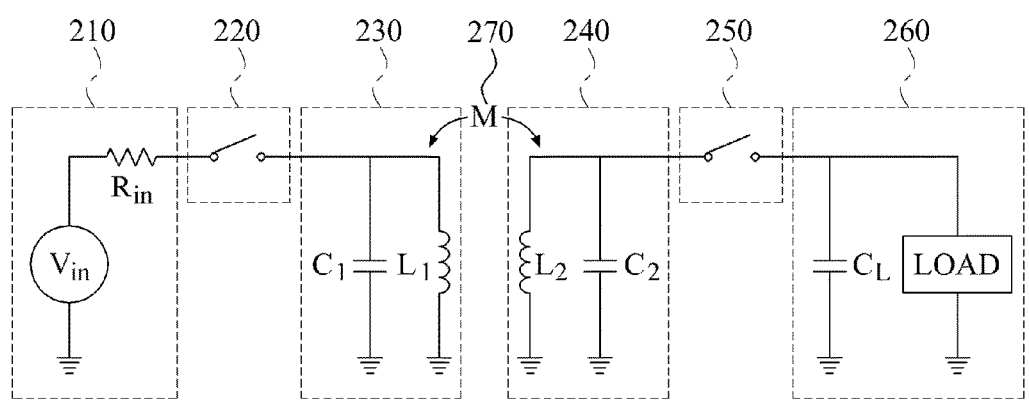
FIG. 2 is a diagram illustrating another example of an equivalent circuit of a wireless power transmission system.

FIG. 2 illustrates another example of an equivalent circuit of a wireless power transmission system. FIG. 2 illustrates another example of an RI system.

Referring to FIG. 2, the wireless power transmission system includes a source-target structure including a source device and a target device. The wireless power transmission system includes a wireless power transmitter corresponding to the source device, and a wireless power receiver corresponding to the target device.

In more detail, the wireless power transmitter includes a power charging unit 210, a control unit 220, and a transmitting unit 230. The power charging unit 210 is physically separated from the transmitting unit 230 by the control unit 220. The wireless power receiver includes a charging unit 240, a control unit 250, and a power output unit 260. The charging unit 240 is physically separated from the power output unit 260 by the control unit 250.

In this example, the power charging unit 210 includes a power supply unit $V_{in}$ and an internal resistor $R_{in}$. The transmitting unit 230 includes a capacitor $C_1$ and an inductor $L_1$. In FIG. 2, the capacitor $C_1$ and the inductor $L_1$ are referred to as a source resonator. In this example, the source resonator functions as the transmitting unit 230. The transmitting unit 230 transmits energy stored in the source resonator to a target resonator, through mutual resonance M 270 between the source resonator and the target resonator.

The control unit 220 includes a switch, and turns on (e.g., closes) the switch to enable power to be supplied from the power charging unit 210 to the transmitting unit 230. In more detail, a voltage from the power supply unit $V_{in}$ is applied to the capacitor $C_1$, and a current is applied to the inductor $L_1$. For example, when the source resonator reaches a steady state due to the voltage applied from the power supply unit $V_{in}$, the voltage applied to the capacitor $C_1$ may include a value of '0', and the current flowing in the inductor $L_1$ may include a value of '$V_{in}/R_{in}$'. In the steady state, the source resonator may be charged with power, using the current applied to the inductor $L_1$.

When the power used to charge the source resonator in the steady state reaches a predetermined value or a maximum value, the control unit 220 turns off (e.g., opens) the switch. The control unit 220 may set information on the predetermined value. By turning off the switch, the control unit 220 separates the power charging unit 210 from the transmitting unit 230. When the power charging unit 210 is separated from the transmitting unit 230, the source resonator starts self-resonating between the capacitor $C_1$ and the inductor $L_1$. Energy stored in the source resonator is transferred to the target resonator, through the mutual resonance M 270 between the source resonator and the target resonator. A resonant frequency $f_1$ of the source resonator may be the same as a resonant frequency $f_2$ of the target resonator. Additionally, a value of the resonant frequency $f_1$, and a value of resonant frequency $f_2$, may be determined based on the following equations.

$$f_1 = \frac{1}{2\pi\sqrt{L_1 C_1}}, \quad (1)$$

$$f_2 = \frac{1}{2\pi\sqrt{L_2 C_2}}$$

In Equations (1), $L_1$ denotes an inductance of the inductor $L_1$, $C_1$ denotes a capacitance of the capacitor $C_1$, $L_2$ denotes an inductance of an inductor $L_2$ of the target resonator, and $C_2$ denotes a capacitance of a capacitor $C_2$ of the target resonator.

The transmitting unit 230 may quantize the energy stored in the source resonator, and may transmit the quantized energy to the target resonator for a symbol unit. For example, the transmitting unit 230 may control different amounts of the energy to be transmitted to the target resonator for each symbol unit, and may also transmit information to the target resonator. The symbol unit may be used to transfer the information in a single bit between the source device and the target device. The symbol unit refers to a period or cycle during which the charged capacitor $C_1$ and the inductor $L_1$ are discharged through the mutual resonance M 270 between the source resonator and target resonator, based on an operation of the control unit 220.

In this example, the charging unit 240 includes the capacitor $C_2$ and the inductor $L_2$. In FIG. 2, the capacitor $C_2$ and the inductor $L_2$ are referred to as the target resonator. In this example, the target resonator functions as the charging unit 240. The charging unit 240 receives the energy stored in the source resonator via the target resonator, through the mutual resonance M 270 between the source resonator and the target resonator. The power output unit 260 includes a load and a capacitor $C_L$.

The control unit 250 includes a switch, and turns off (e.g., opens) the switch. By turning off the switch, the control unit 250 separates the charging unit 240 from the power output unit 260. During the mutual resonance M 270 between the source resonator and the target resonator, the source resonator is separated from the power supply unit $V_{in}$ by the control unit 220 including the switch being open, and the target resonator is separated from the load and the capacitor $C_L$ by the control unit 250 including the switch being open. The energy stored in the source resonator is transferred to the target resonator, through the mutual resonance M 270. In more detail, the energy stored in the source resonator charges the capacitor $C_2$ and the inductor $L_2$ of the charging unit 240, through the mutual resonance M 270. The resonant frequency $f_1$ of the source resonator may be the same as the resonant frequency $f_2$ of the target resonator.

When the energy used to charge the target resonator reaches a predetermined value or a maximum value, the control unit 250 turns on (e.g., closes) the switch. The control unit 250 may set information on the predetermined value. By turning on the switch, the control unit 250 connects the capacitor $C_L$ to the charging unit 240, and the resonant frequency of the target resonator is changed. A value of the changed resonant frequency $f'_2$ of the target resonator may be determined based on the following equation.

$$f'_2 = \frac{1}{2\pi\sqrt{L_2(C_2 + C_L)}} \quad (2)$$

In Equation (2), $C_L$ denotes a capacitance of the capacitor $C_L$.

Accordingly, the mutual resonance M 270 between the source resonator and the target resonator is terminated. For example, when the changed resonant frequency $f'_2$ is much smaller than the resonant frequency $f_2$ based on a Q-factor of the target resonator, the mutual resonance M 270 is removed. Additionally, the charging unit 240 transfers power used to charge the capacitor $C_2$ and the inductor $L_2$ to the power output unit 260, which transfers the power to a load.

When the energy used to charge the target resonator is less than a predetermined value, the control unit 250 turns off the switch. The charging unit 240 may recharge the target resonator with energy using the mutual resonance M 270 between the source resonator and the target resonator.

For example, the charging unit 240 may receive the energy from the transmitting unit 230 for a symbol unit. The charging unit 240 may also receive the information from the transmitting unit 230, and may demodulate the information based on an amount of the received energy.

During the mutual resonance M 270 between the source resonator and the target resonator, the switch of the control unit 250 is not connected between the charging unit 240 and the power output unit 260. Accordingly, it is possible to prevent transmission efficiency from being reduced due to a connection to the switch.

A scheme of controlling a point in time of capturing energy stored in a target resonator of FIG. 2 may be performed more easily than a scheme of transferring energy stored in a capacitor of FIG. 1. In the scheme of transferring the energy stored in a capacitor, only the energy in the capacitor is captured. However, in a scheme of changing a resonant frequency of the target resonator and capturing the energy stored in the target resonator, the energy stored in an inductor and a capacitor of the target resonator is captured. Accordingly, a degree of freedom for the point in time of capturing the energy may be improved.

To transmit power or data, a transmitter in an RI system may repeatedly charge a source resonator with energy and discharge energy through a connection to a switch. In various examples herein, a single charge and discharge of energy may be referred as a single symbol. To receive energy or data from the transmitter, a receiver in the RI system may operate a switch of the receiver based on an operation period of a switch of the transmitter that repeatedly performs charging and discharging.

To receive power or data from the transmitter without an error, the receiver may need to know when the switch of the transmitter is powered off, when the switch of the transmitter is powered on, when a mutual resonance is started, and when energy stored in the target resonator includes a peak value. An method of acquiring information regarding an on/off time of the switch of the transmitter, and matching an on/off time of the switch of the receiver to the acquired information, may be referred as a time synchronization.

Figure 3A:
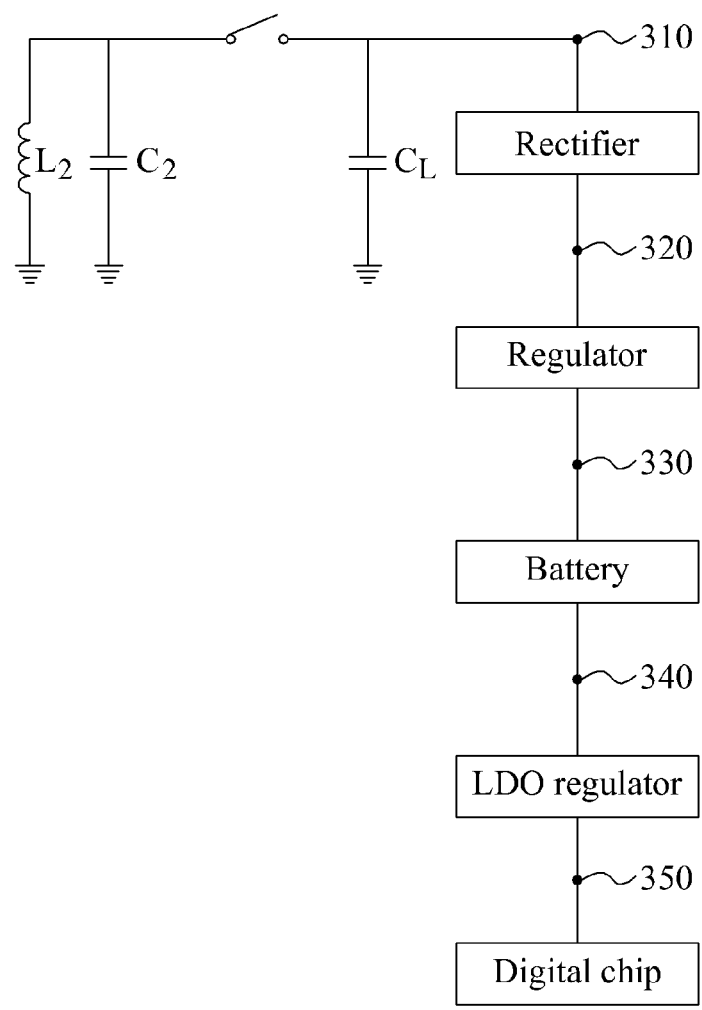
FIGS. 3A through 3E are diagrams illustrating an example of a wireless power receiver, and examples of waveforms of voltages measured at a rear end of a target resonator when a passive device is not connected to the target resonator in the wireless power receiver.

FIGS. 3A through 3E illustrate an example of a wireless power receiver, and examples of waveforms of voltages measured at a rear end of a target resonator when a passive device is not connected to the target resonator in the wireless power receiver. Referring to FIG. 3A, the wireless power receiver includes the target resonator, including an inductor $L_2$ and a capacitor $C_2$, a switch connected to the rear end of the target resonator, a capacitor $C_L$, a rectifier, a regulator, a battery, a Low-Drop Output (LDO) regulator, and a digital chip.

When the switch is powered on, the capacitor $C_L$ is connected to the target resonator, and a resonant frequency of the target resonator is changed. Accordingly, a resonant frequency of a source resonator of a wireless power transmitter is no longer matched to the resonant frequency of the target resonator, and a mutual resonance between the source resonator and the target resonator is terminated. In this example, power stored in the target resonator is transferred to the battery through the rectifier and the regulator; that is, the battery is charged. In more detail, the rectifier rectifies an AC signal of the power to a DC signal, and the regulator steps up or steps down the rectified voltage to a voltage needed by the battery. Power stored in the battery is transferred to the digital chip through the LDO regulator. The LDO regulator steps down an output voltage of the battery to a voltage needed by the digital chip.

Figure 3B:
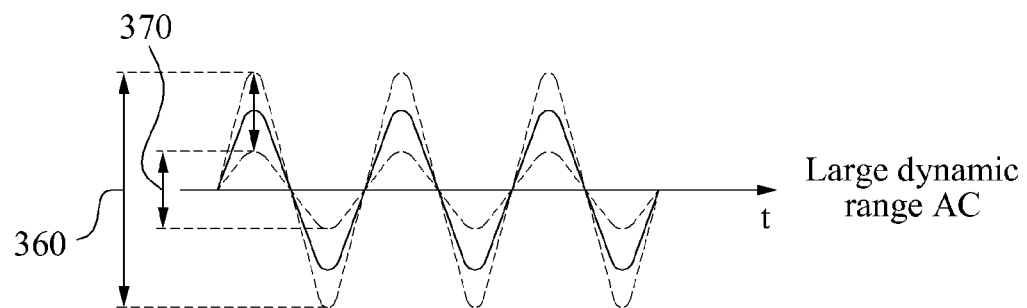

Referring to FIGS. 3A and 3B, a waveform (e.g., an AC signal) of a voltage measured at an input end 310 of the rectifier is shown. The waveform of the voltage may include, for example, a dynamic range 360 or 370. That is, based on a channel characteristic between the source resonator and the target resonator, an amplitude of a signal received by the target resonator may be changed by a large width. When a distance between the source resonator and the target resonator is decreased, an amount of power transferred from the source resonator to the target resonator may be increased, and the amplitude of the signal received by the target resonator may be increased. When the distance between the source resonator and the target resonator is increased, the amount of the power transferred from the source resonator to the target resonator may be decreased, and the amplitude of the signal received by the target resonator may be decreased.

Figure 3C:
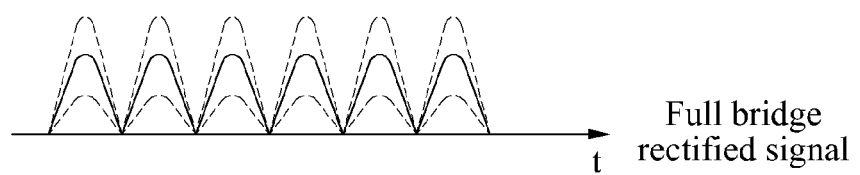

Referring to FIGS. 3A and 3C, a waveform of a voltage measured at an output end 320 of the rectifier is shown. The waveform of the voltage indicates a signal that is full bridge rectified by the rectifier.

Figure 3D:
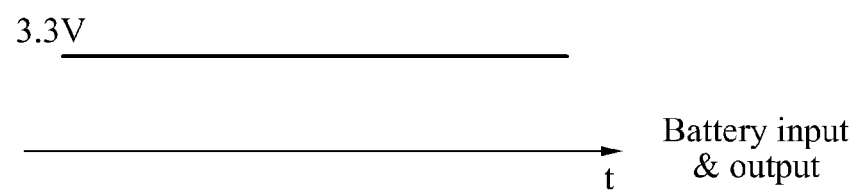

Referring to FIGS. 3A and 3D, a waveform of a voltage measured at an output end 330 of the regulator and an output end 340 of the battery is shown. The regulator generates a voltage suitable for a rated voltage of the battery. For example, if the rated voltage of the battery is set to 3.3 V, the regulator generates a DC signal of 3.3 V from the rectified signal to be input to the battery. The regulator may include a booster converter configured to step up an input voltage, and/or a buck converter configured to step down the input voltage. Additionally, the battery outputs a voltage of 3.3 V at the output end 340.

Figure 3E:
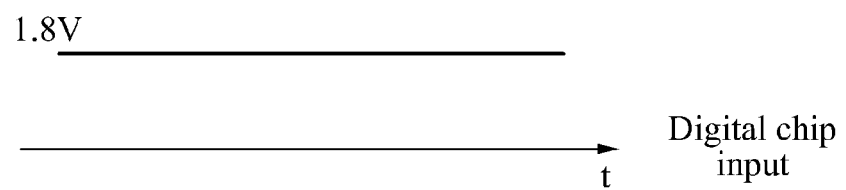

Referring to FIGS. 3A and 3E, a waveform of a voltage measured at an output end 350 of the LDO regulator is shown. The LDO regulator steps down the voltage output from the battery to the voltage needed by the digital chip. For example, if the digital chip needs a voltage of 1.8 V, the LDO regulator steps down the voltage of 3.3 V output from the battery to 1.8 V to be input to the digital chip.

Referring again to FIGS. 3A and 3B, based on the distance between the source resonator and the target resonator, the dynamic range 360 may be changed to the dynamic range 370, or vice versa. As a variation in a dynamic range, for example, a variation from the dynamic range 360 to the dynamic range 370, or a variation from the dynamic range 370 to the dynamic range 360, increases, an operation efficiency of the regulator and a charging efficiency of the battery may decrease. In other words, when a signal is adjusted to a dynamic range including a predetermined width at the output end 320 of the rectifier, despite a large variation in the dynamic range, the operation efficiency of the regulator and the charging efficiency of the battery may increase.

Figure 4:
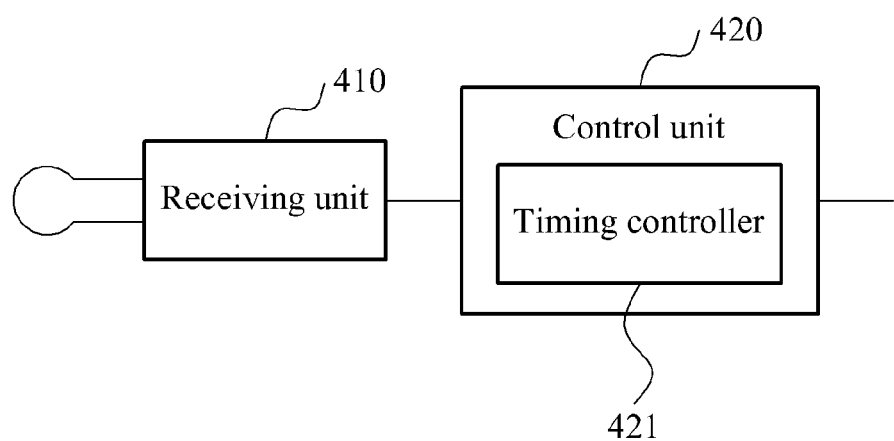
FIG. 4 is a block diagram illustrating an example of a wireless power receiver.

FIG. 4 illustrates an example of a wireless power receiver. Referring to FIG. 4, the wireless power receiver includes a receiving unit 410 and a control unit 420. The control unit 420 includes a timing controller 421.

The receiving unit 410 wirelessly receives power through a mutual resonance between a source resonator of a wireless power transmitter and a target resonator of the wireless power receiver. The receiving unit 410 may include the target resonator.

The control unit 420 connects the target resonator to a passive device (e.g., one or more capacitors) to control a dynamic range of a voltage output from the target resonator. The voltage output from the target resonator may be applied to a rectifier. Accordingly, the control unit 420 controls a dynamic range of a voltage input to the rectifier, using the passive device.

The passive device may include, for example, a first capacitor and a second capacitor. The first capacitor may include a capacitance greater than or equal to a capacitance of a capacitor included in the target resonator, and the second capacitor may include a capacitance less than the capacitance of the capacitor included in the target resonator.

In an example, the control unit 420 may connect the target resonator to the first capacitor and/or the second capacitor, to change a resonant frequency of the target resonator, and to attenuate the dynamic range of the voltage output from the target resonator. In this example, the target resonator may be connected in parallel to the first capacitor and/or the second capacitor. If the target resonator is connected to the first capacitor, power stored in the target resonator may be transferred to the first capacitor. Accordingly, the dynamic range of the voltage output from the target resonator may be attenuated in proportion to the capacitance of the first capacitor. In other words, an amplitude of a waveform of the voltage output from the target resonator may be decreased. If the target resonator is connected to the second capacitor, the power stored in the target resonator may be transferred to the second capacitor, and accordingly, the dynamic range of the voltage output from the target resonator may be attenuated in proportion to the capacitance of the second capacitor.

In another example, the control unit 420 may connect the target resonator to the second capacitor, to change the resonant frequency of the target resonator, and to amplify the dynamic range of the voltage output from the target resonator. In more detail, the target resonator includes an inductor and a capacitor. The control unit 420 may disconnect the capacitor of the target resonator from the inductor of the target resonator, and may connect the inductor to the second capacitor in parallel. The amplitude of the waveform of the voltage output from the target resonator may increase in proportion to a difference between the capacitance of the second capacitor and the capacitance of the capacitor in the target resonator.

In still another example, the control unit 420 may connect the target resonator to the first capacitor and the second capacitor during the mutual resonance. If the target resonator is connected in parallel to the first capacitor and the second capacitor during the mutual resonance, a capacitance of the wireless power receiver may be increased. Accordingly, the amplitude of the waveform of the voltage output from the target resonator may be decreased, and a period of the waveform of the output voltage may be lengthened. If a voltage of the capacitor in the target resonator becomes less than or equal to a predetermined value, the capacitor in the target resonator may be disconnected from the inductor in the target resonator. The predetermined value may be set to, for example, 0 V. The control unit 420 may disconnect the capacitor in the target resonator from the inductor in the target resonator at a time at which the voltage of the capacitor in the target resonator includes a minimum value. Subsequently, the control unit 420 may disconnect the target resonator from the first capacitor, and may connect the target resonator to a load to capture the power stored in the target resonator in the load.

The control unit 420 may be connected to the rectifier and a regulator. If a voltage greater than an output voltage of the control unit 420 is needed as an input voltage of the regulator, the control unit 420 may connect the second capacitor to the target resonator, and disconnect the capacitor of the target resonator from the inductor of the target resonator, to amplify an amplitude of the output voltage. If a voltage less than the output voltage of the control unit 420 is needed as the input voltage of the regulator, the control unit 420 may connect the first capacitor and/or the second capacitor to the target resonator to attenuate the amplitude of the output voltage.

To attenuate the voltage output from the target resonator, the timing controller 421 controls a timing in which the first capacitor and/or the second capacitor are connected to the target resonator. For example, if the power stored in the target resonator is greater than or equal to a predetermined value, the timing controller 421 may connect the target resonator to the first capacitor. In this example, the predetermined value may be a maximum value of the power to be stored in the target resonator. As the amplitude of the voltage output from the target resonator decreases, the dynamic range of the voltage output from the target resonator becomes narrower.

To amplify the voltage output from the target resonator, the timing controller 421 controls a timing in which the second capacitor is connected to the target resonator, and the capacitor of the target resonator is disconnected from the inductor of the target resonator. As the amplitude of the voltage output from the target resonator increases, the dynamic range of the voltage output from the target resonator becomes wider.

The control unit 420 may control an overall operation of the wireless power receiver of FIG. 4, and may perform a function of the receiving unit 410. The receiving unit 410 and the control unit 420 are separately illustrated in FIG. 4 to separately describe each function. Thus, in response to implementing a product, the control unit 420 may perform all functions, or may perform a portion of the functions.

Figure 5A:
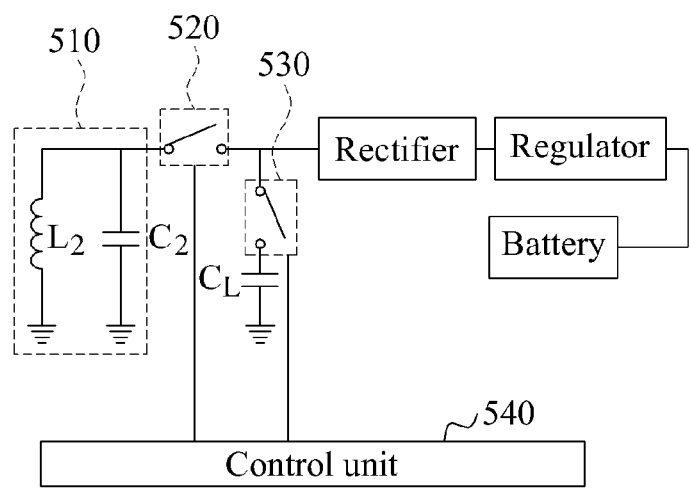
FIGS. 5A through 10C are diagrams illustrating examples of configurations and operations of wireless power receivers.

FIGS. 5A through 10C illustrate examples of configurations and operations of wireless power receivers. FIG. 5A illustrates an example of a configuration of a wireless power receiver configured to attenuate an amplitude of a signal input to a rectifier, and FIG. 5B illustrates an example of a change in the amplitude of the signal input to the rectifier based on an operation of a second switch unit 530 of FIG. 5A.

Referring to FIG. 5A, the wireless power receiver includes a target resonator 510, a first switch unit 520, the second switch unit 530, and a control unit 540. Additionally, the wireless power receiver includes the rectifier, a regulator, a battery, and/or other elements located at a rear end of the second switch unit 530 and known to one of ordinary skill in the art. The wireless power receiver attenuates an amplitude of a signal output from the target resonator 510.

The target resonator 510 includes an inductor $L_2$ and a capacitor $C_2$. The first switch unit 520 connects the target resonator 510 to the rectifier. The second switch unit 530 connects a capacitor $C_L$ to the target resonator 510 in parallel between the target resonator 510 and the rectifier. In this example, a capacitance of the capacitor $C_L$ may be equal to, greater than, or less than a capacitance of the capacitor $C_2$. The control unit 540 controls an operation of the first switch unit 520 and an operation of the second switch unit 530.

When the second switch unit 530 is in an on state, and the first switch unit 520 is powered on, a portion of power needed to be input to the rectifier is distributed to the capacitor $C_L$, and accordingly, the amplitude of the signal input to the rectifier may be decreased. A width of the decreased amplitude may be adjusted based on the capacitance of the capacitor $C_L$.

Figure 5B:
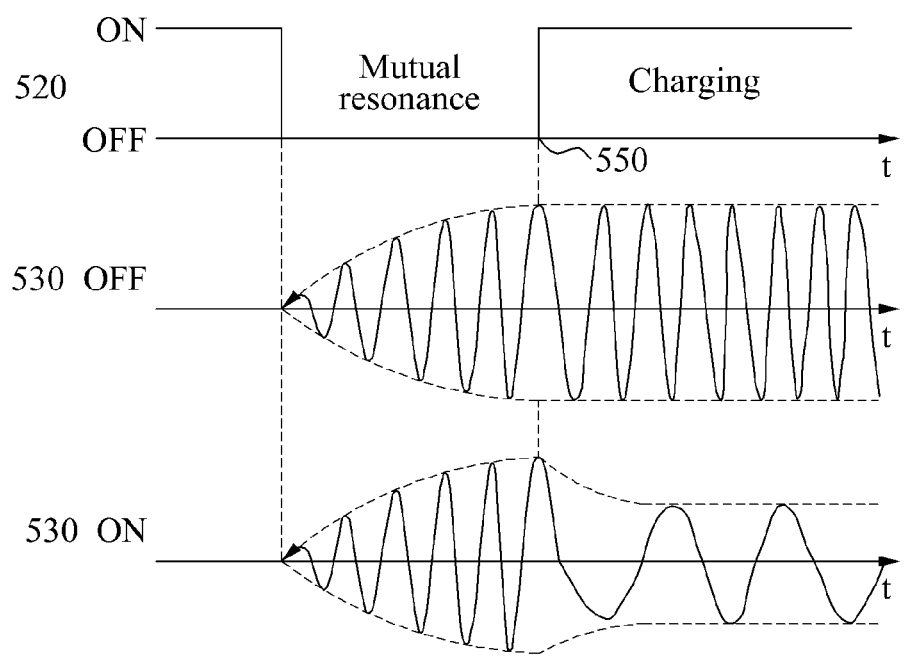

Referring to FIGS. 5A and 5B, in an interval in which the first switch unit 520 is in an off state, a mutual resonance between the target resonator 510 and a source resonator of a wireless power transmitter occurs. When the mutual resonance occurs, and when the first switch unit 520 is powered on, the target resonator 510 is connected to the rectifier, and power stored in the target resonator 510 is transferred to the battery through the rectifier and the regulator. In other words, the wireless power receiver performs charging of the battery. If the second switch unit 530 is maintained in the off state, a signal output from the target resonator 510 is transferred to the rectifier without a change. If the second switch unit 530 is powered on at a time 550, a portion of the power stored in the target resonator 510 charges the capacitor $C_L$, and accordingly, the amplitude of the signal input to the rectifier is decreased.

Figure 6A:
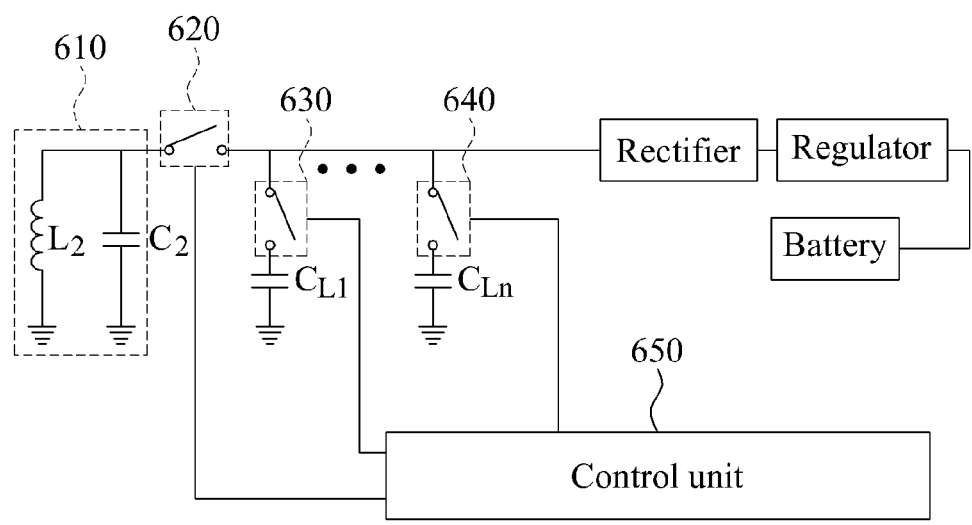
Figure 6B:
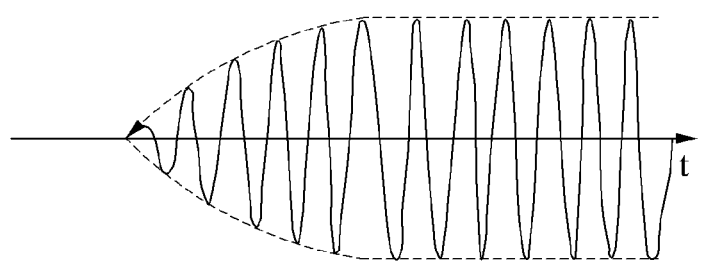
Figure 6C:
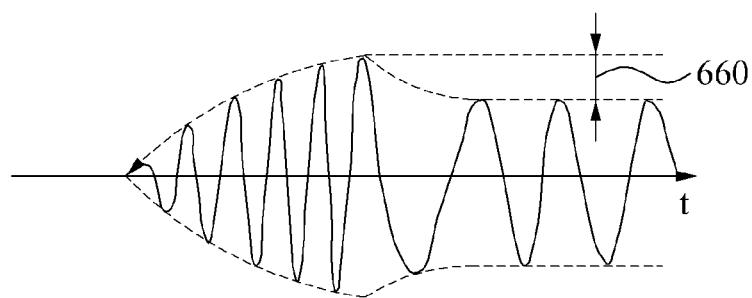
Figure 6D:
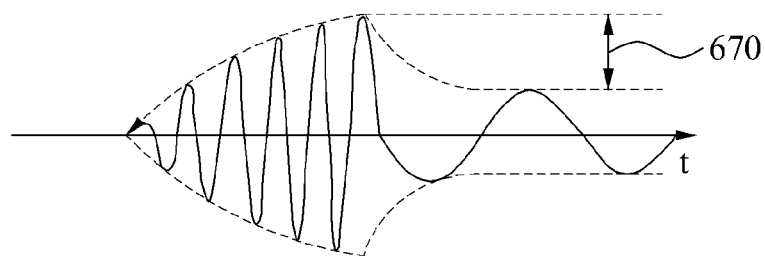

FIG. 6A illustrates an example of a configuration of a wireless power receiver configured to attenuate an amplitude of a signal input to a rectifier in various widths. FIGS. 6B through 6D illustrate examples of a change in the amplitude of the signal input to the rectifier based on operations of a second switch unit 630 and a third switch unit 640 of FIG. 6A.

Referring to FIG. 6A, the wireless power receiver includes a target resonator 610, a first switch unit 620, the second switch unit 630, the third switch unit 640, and a control unit 650. The wireless power receiver further includes the rectifier, a regulator, a battery, and/or other elements located at a rear end of the third switch unit 640 and known to one of ordinary skill in the art. The wireless power receiver attenuates an amplitude of an amplitude of a signal output from the target resonator 610 in various widths.

The target resonator 610 includes an inductor $L_2$ and a capacitor $C_2$. The first switch unit 620 connects the target resonator 610 to the rectifier. The second switch unit 630 connects a capacitor $C_{L1}$ to the target resonator 610 in parallel between the target resonator 610 and the rectifier. In this example, a capacitance of the capacitor $C_{L1}$ may be equal to, greater than, or less than a capacitance of the capacitor $C_2$.

The third switch unit 640 connects a capacitor $C_{Ln}$ to the target resonator 610 in parallel between the capacitor $C_{L1}$ and the rectifier. In this example, a capacitance of the capacitor $C_{Ln}$ may be equal to, greater than, or less than the capacitance of the capacitor $C_{L1}$. The control unit 650 controls an operation of each of the first switch unit 620, the second switch unit 630 and the third switch unit 640.

When the second switch unit 630 is in an on state, and when the first switch unit 620 is powered on, a portion of power needed to be input to the rectifier is distributed to the capacitor $C_{L1}$, and accordingly, the amplitude of the signal input to the rectifier is decreased. When each of the second switch unit 630 and the third switch unit 640 are in the on state, and when the first switch unit 620 is powered on, a portion of the power needed to be input to the rectifier is distributed to the capacitors $C_{L1}$ and $C_{Ln}$, and accordingly, the amplitude of the signal input to the rectifier is further decreased. The amplitude of the signal input to the rectifier may be adjusted based on a number of connected capacitors, e.g., the capacitances of the capacitors $C_{L1}$ and $C_{Ln}$.

Referring to FIGS. 6A and 6B, in an interval in which the first switch unit 620 is in an off state, a mutual resonance between the target resonator 610 and a source resonator of a wireless power transmitter occurs. When the first switch unit 620 is powered on after the mutual resonance, the target resonator 610 is connected to the rectifier, and power stored in the target resonator 610 is transferred to the battery through the rectifier and the regulator. When the second switch unit 630 and the third switch unit 640 are maintained in the off state, the signal output from the target resonator 610 is transferred to the rectifier without a change, as shown in FIG. 6B.

Referring to FIGS. 6A and 6C, in an example when the second switch unit 630 is in the on state, and when the first switch unit 620 is powered on, a portion of the power stored in the target resonator 610 charges the capacitor $C_{L1}$. Accordingly, the amplitude of the signal input to the rectifier is decreased by a width 660.

Referring to FIGS. 6A and 6D, when the second switch unit 630 and the third switch unit 640 are in the on state, and when the first switch unit 620 is powered on, a portion of the power stored in the target resonator 610 charges the capacitors $C_{L1}$ and $C_{Ln}$. Accordingly, the amplitude of the signal input to the rectifier is decreased by a width 670. Thus, the amplitude of the signal input to the rectifier is decreased based on a capacitance of one or more capacitors connected in parallel to the target resonator 610, or based on a number of the capacitors.

Figure 7:
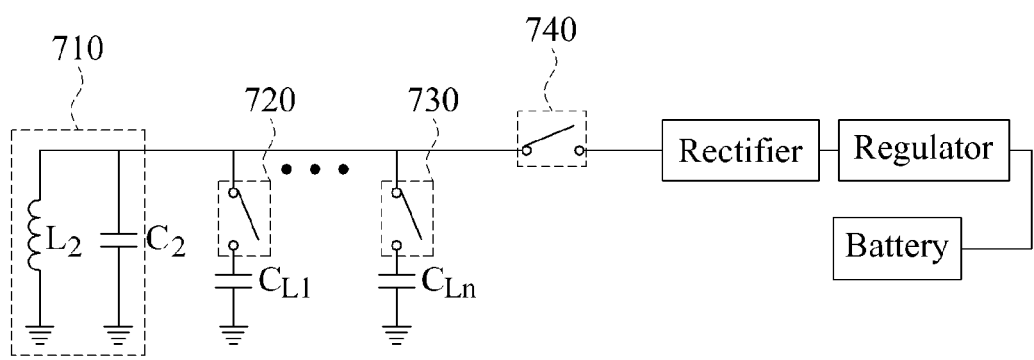

Referring to FIG. 7, a wireless power receiver includes a target resonator 710, a first switch unit 720, a second switch unit 730, and a third switch unit 740. The wireless power receiver further includes a rectifier, a regulator, a battery, and/or other elements located at a rear end of the third switch unit 740 and known to one of ordinary skill in the art. Comparing with FIG. 6A, the third switch unit 740 that connects the target resonator 710 and the rectifier is located at a rear end of the second switch unit 730 and a capacitor $C_{Ln}$. That is, the third switch unit 740 is connected to the rear end of the second switch unit 730 and the capacitor $C_{Ln}$ in series, and between the second switch unit 730 and the rectifier. A Q-factor of the target resonator 710 may be changed based on a location of each of the third switch unit 740 and capacitors $C_{L1}$ and $C_{Ln}$. The first switch unit 720, the second switch unit 730, and the third switch unit 740 may be powered on or off at the same operation timing, by a control unit, e.g., the control unit 540 of FIG. 5A.

Figure 8:
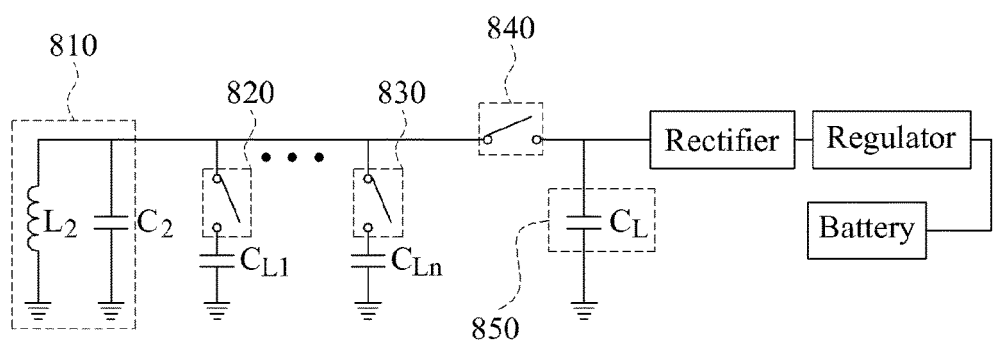

Referring to FIG. 8, a wireless power receiver includes a target resonator 810, a first switch unit 820, a second switch unit 830, a third switch unit 840, and a default capacitor $C_L$ 850. The wireless power receiver further includes a rectifier, a regulator, a battery, and/or other elements located at a rear end of the default capacitor $C_L$ 850 and known to one of ordinary skill in the art. Comparing with FIG. 7, the default capacitor $C_L$ 850 is configured to change a resonant frequency of the target resonator 810, and is connected to a rear end of the third switch unit 840 in series between the third switch unit 840 and the rectifier. because of the default capacitor $C_L$ 850, the first switch unit 820 and the second switch unit 830 may not need to be powered on or off at the same operation timing as the third switch unit 840, by a control unit, e.g., the control unit 540 of FIG. 5A.

Figure 9A:
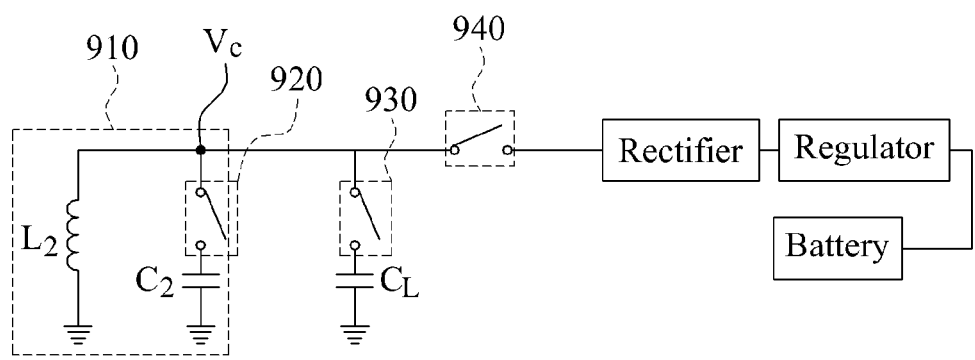
Figure 9B:
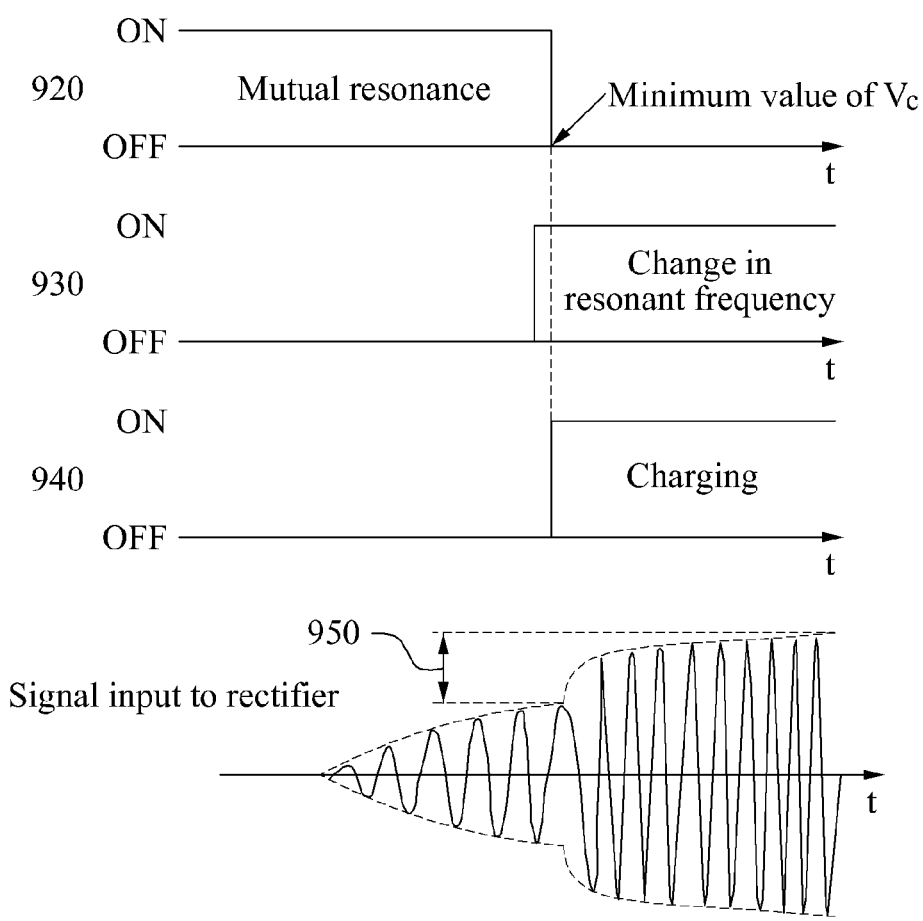
Figure 9C:
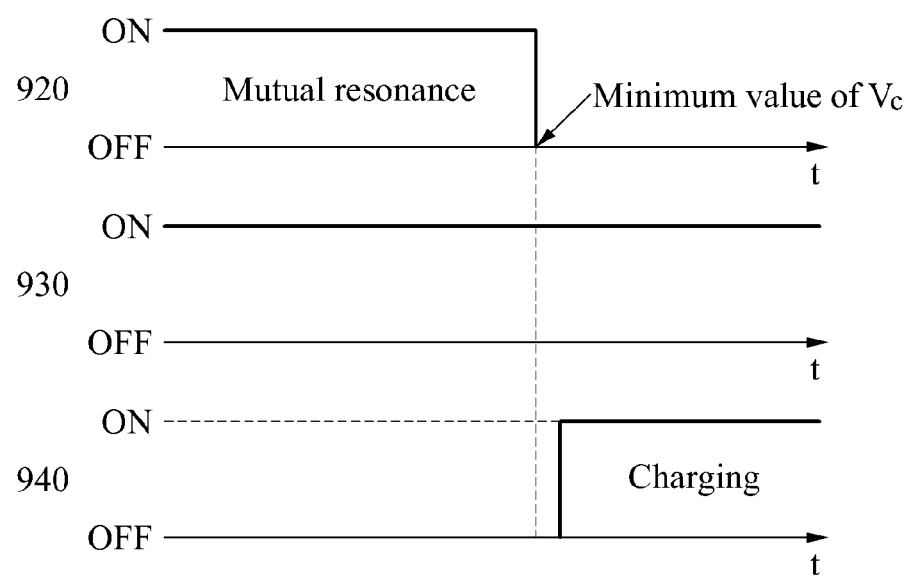

FIG. 9A illustrates an example of a configuration of a wireless power receiver configured to amplify an amplitude of a signal input to a rectifier. FIGS. 9B and 9C illustrate examples of a change in the amplitude of the signal input to the rectifier based on an operation of each of a first switch unit 920, a second switch unit 930 and a third switch unit 940 of FIG. 9A.

Referring to FIG. 9A, the wireless power receiver includes a target resonator 910, the first switch unit 920, the second switch unit 930 and the third switch unit 940. The wireless power receiver further includes a rectifier, a regulator, a battery, and/or other elements located at a rear end of the third switch unit 940 and known to one of ordinary skill in the art. The wireless power receiver may further include a control unit (e.g., the control unit 540 of FIG. 5A) that controls an operation of each of the first switch unit 920, the second switch unit 930 and the third switch unit 940.

The second switch unit 930 connects the target resonator 910 to a capacitor $C_L$ in parallel during a mutual resonance. In this example, a capacitance of the capacitor $C_L$ may be less than a capacitance of a capacitor $C_2$ included in the target resonator 910. For example, when an amount of power stored in the target resonator 910 is greater than or equal to a predetermined value, the second switch unit 930 connects the target resonator 910 to the capacitor $C_L$ in parallel. In this example, the predetermined value may be set to a maximum amount of the power that may be stored in the target resonator 910.

In an example, when a voltage of the capacitor $C_2$ is less than or equal to a predetermined value, the first switch unit 920 disconnects the capacitor $C_2$ from an inductor $L_2$ included in the target resonator 910. In this example, the predetermined value may be set to 0 V. For example, when a voltage $V_C$ measured in the target resonator 910 is less than or equal to 0 V, the first switch unit 920 may disconnect the capacitor $C_2$ from the inductor $L_2$.

In another example, when a voltage of the inductor $L_2$ is greater than or equal to a predetermined value, the first switch unit 920 disconnects the capacitor $C_2$ from the inductor $L_2$. In this example, the predetermined value may be set to a maximum value of the voltage that may be applied to the inductor $L_2$.

The power stored in the target resonator 910 is moved between the capacitor $C_2$ and the inductor $L_2$ through a self-resonance. For example, when all of the power stored in the target resonator 910 is moved to the inductor $L_2$, the first switch unit 920 may disconnect the capacitor $C_2$ from the inductor $L_2$.

When the capacitor $C_2$ and the inductor $L_2$ are disconnected from each other, the inductor $L_2$ may be connected to the capacitor $C_L$ only. Since the capacitance of the capacitor $C_L$ is less than the capacitance of the capacitor $C_2$, the amplitude of the signal input to the rectifier may be increased. A width of the increased amplitude may be adjusted based on the capacitance of the capacitor $C_L$. When the target resonator 910 is connected in parallel to the capacitor $C_L$, the third switch unit 940 may connect the capacitor $C_L$ to the rectifier.

Referring to FIGS. 9A and 9B, in an interval in which the first switch unit 920 is in an on state, a mutual resonance between the target resonator 910 and a source resonator of a wireless power transmitter occurs. When the second switch unit 930 is powered on, and when the target resonator 910 is connected to the capacitor $C_L$, a resonant frequency of the target resonator 910 is changed. When the resonant frequency of the target resonator 910 is changed, the first switch unit 920 is powered off at a time in which a voltage $V_C$ measured at the capacitor $C_2$ includes a minimum value. Subsequently, when the third switch unit 940 is powered on, the target resonator 910 is connected to the rectifier, and the power stored in the target resonator 910 is transferred to the battery through the rectifier and the regulator. That is, the wireless power receiver performs charging of the battery.

When the second switch unit 930 is powered on, and when the first switch unit 920 is powered off, the amplitude of the signal input to the rectifier is amplified by a width 950, as illustrated in FIG. 9B. In this example, the width 950 may be determined based on a difference between the capacitance of the capacitor $C_2$ and the capacitance of the capacitor $C_L$. As the difference between the capacitances $C_2$ and $C_L$ increases, the width 950 increases. When the third switch unit 940 is powered on, the signal with the amplified amplitude is converted in the rectifier and the regulator, and the converted signal is transferred to the battery.

FIG. 9C illustrates an example of an operation of each of the first switch unit 920, the second switch unit 930, and the third switch unit 940 of FIG. 9A that are performed when the mutual resonance occurs in a state in which the capacitors $C_2$ and $C_L$ are connected in parallel to the inductor $L_2$. For example, FIG. 9B illustrates an example in which the capacitance of the capacitor $C_2$ is 1 nF (nanofarad), and FIG. 9C illustrates an example in which the capacitance of both of the capacitors $C_2$ and $C_L$ is 0.5 nF.

Referring to FIG. 9C, in an interval in which the first switch unit 920 and the second switch unit 930 are in the on state, the mutual resonance between the target resonator 910 and the source resonator occurs. As a result of the mutual resonance, the first switch unit 920 is powered off at a time in which the voltage $V_C$ measured at the capacitor $C_2$ includes a minimum value. When the first switch unit 920 is powered off, the capacitor $C_2$ is disconnected from the inductor $L_2$ and the capacitor $C_L$, and the resonant frequency of the target resonator 910 is changed. When the first switch unit 920 is powered off, the inductor $L_2$ is connected to the capacitor $C_L$ only. Subsequently, when the third switch unit 940 is powered on, the target resonator 910 is connected to the rectifier, and the power stored in the target resonator 910 is transferred to the battery through the rectifier and the regulator. That is, the wireless power receiver performs the charging of the battery.

When the first switch unit 920 is powered off, the amplitude of the signal input to the rectifier is amplified. A width of the amplified amplitude may be determined based on a difference between the capacitance of the capacitor $C_2$ and the capacitance of the capacitor $C_L$. When the third switch unit 940 is powered on, the signal with the amplified amplitude is converted in the rectifier and the regulator, and the converted signal is transferred to the battery.

Figure 10A:
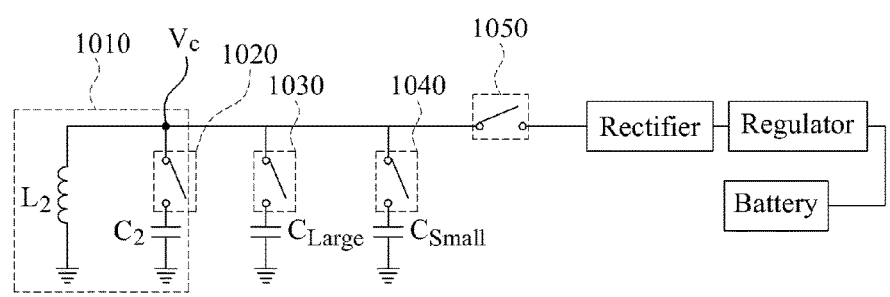
Figure 10B:
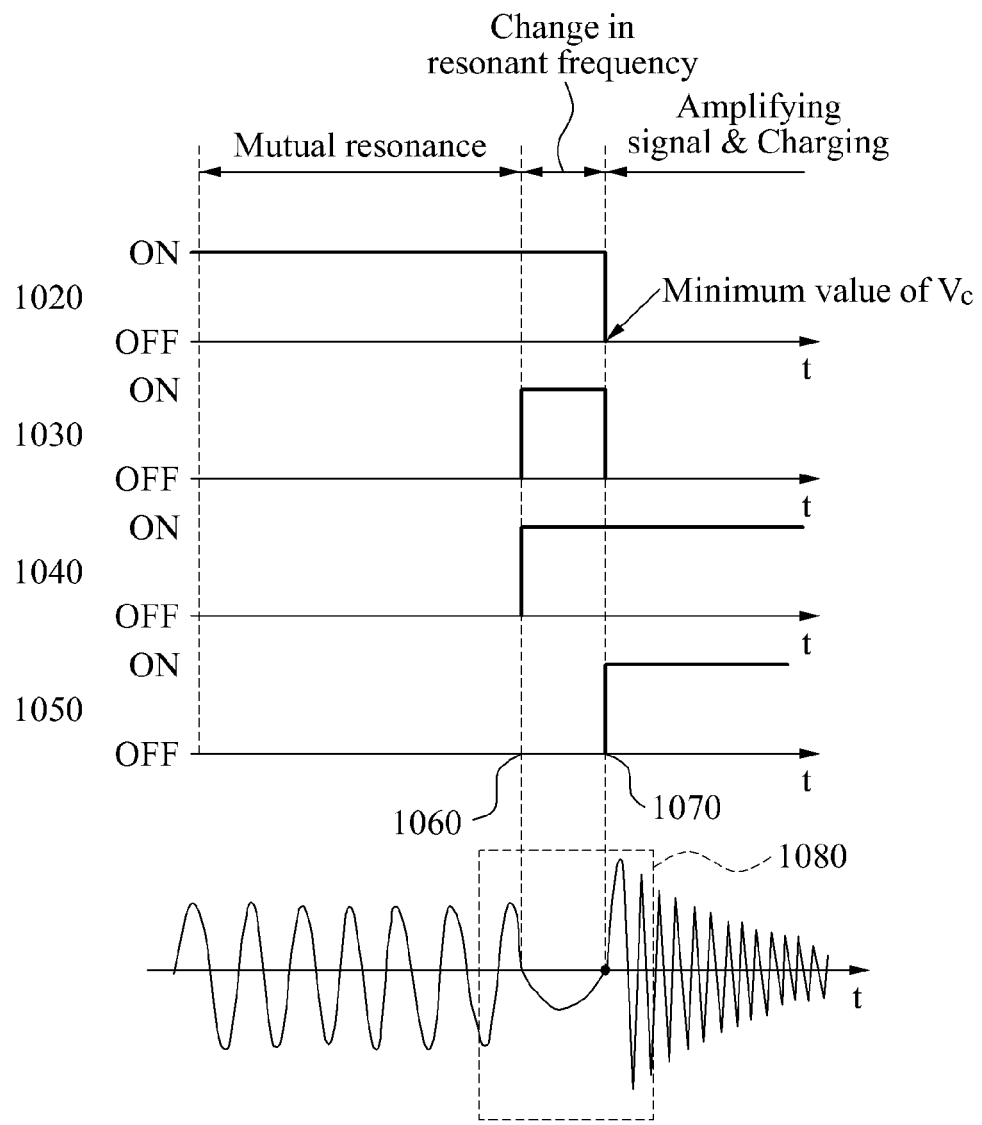
Figure 10C:
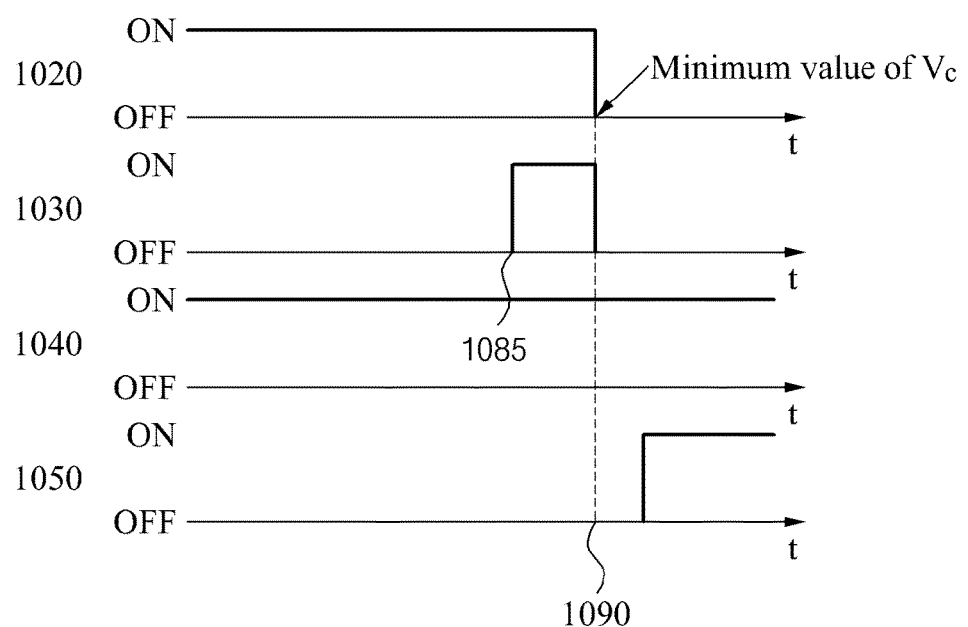

FIG. 10A illustrates an example of a configuration of a wireless power receiver configured to adjust a time at which power is captured, by attenuating and amplifying an amplitude of a signal input to a rectifier. FIGS. 10B and 10C illustrate examples of a change in the amplitude of the signal input to the rectifier based on an operation of each of a first switch unit 1020, a second switch unit 1030, a third switch unit 1040, and a fourth switch unit 1050 of FIG. 10A. When a high resonant frequency is set, it may be difficult to power on the fourth switch unit 1050 accurately at a desired time.

A structure of the wireless power receiver of FIG. 10A may reduce a burden on elaboration of an operation timing of the fourth switch unit 1050, using capacitors $C_{Large}$ and $C_{small}$. A capacitance of the capacitor $C_{Large}$ connected in parallel to a target resonator 1010 may be larger than a capacitance of a capacitor $C_2$ included in the target resonator 1010, and a capacitance of the capacitor $C_{small}$ connected in parallel to the target resonator 1010 may be smaller than the capacitance of the capacitor $C_2$.

Referring to FIG. 10A, the wireless power receiver includes the target resonator 1010, the first switch unit 1020, the second switch unit 1030, the third switch unit 1040, and the fourth switch unit 1050. The wireless power receiver further includes a rectifier, a regulator, a battery and/or other elements located at a rear end of the fourth switch unit 1050 and known to one of ordinary skill in the art. The wireless power receiver may further include a control unit (e.g., the control unit 540 of FIG. 5A) that controls an operation of each of the first switch unit 1020, the second switch unit 1030, the third switch unit 1040, and the fourth switch unit 1050.

The second switch unit 1030 connects the target resonator 1010 to the capacitor $C_{Large}$ in parallel during a mutual resonance between the target resonator 1010 and a source resonator of a wireless power transmitter. The capacitance of the capacitor $C_{Large}$ may be greater than or equal to the capacitance of the capacitor $C_2$.

The third switch unit 1040 connects the target resonator 1010 to the capacitor $C_{small}$ in parallel during the mutual resonance between the target resonator 1010 and the source resonator. The capacitance of the capacitor $C_{small}$ may be less than the capacitance of the capacitor $C_2$. The third switch unit 1040 connects the target resonator 1010 to the capacitor $C_{small}$ in parallel at the same timing as the second switch unit 1030.

When the capacitors $C_{Large}$ and $C_{small}$ are connected to the target resonator 1010, a resonant frequency of the target resonator 1010 is changed. Due to the connection between the capacitors $C_{Large}$ and $C_{small}$, a period of the mutual resonance is lengthened instantaneously. As the period of the mutual resonance becomes longer, the resonant frequency of the target resonator 1010 decreases, and a longer timing to power on the fourth switch unit 1050 is secured.

In an example, when a voltage of the capacitor $C_2$ is less than or equal to a predetermined value, the first switch unit 1020 disconnects the capacitor $C_2$ from an inductor $L_2$ included in the target resonator 1010. In this example, the predetermined value may be set to 0 V. For example, when a voltage $V_C$ measured at the target resonator 1010 is less than or equal to 0 V, the first switch unit 1020 may disconnect the capacitor $C_2$ from the inductor $L_2$.

In another example, when a voltage of the inductor $L_2$ is greater than or equal to a predetermined value, the first switch unit 1020 disconnects the capacitor $C_2$ from the inductor $L_2$. In this example, the predetermined value may be set to a maximum value of the voltage that may be applied to the inductor $L_2$.

The power stored in the target resonator 1010 is moved between the capacitor $C_2$ and the inductor $L_2$ through a self-resonance of the target resonator 1010. For example, when all of the power stored in the target resonator 1010 is moved to the inductor $L_2$, the first switch unit 1020 may disconnect the capacitor $C_2$ from the inductor $L_2$.

When the voltage of the capacitor $C_2$ is less than or equal to a predetermined value, the second switch unit 1030 disconnects the capacitor $C_{Large}$ from the inductor $L_2$. The second switch unit 1030 may be powered off at the same time at which the first switch unit 1020 is powered off.

When the capacitors $C_2$ and $C_{Large}$ and the inductor $L_2$ are disconnected from each other, the inductor $L_2$ may be connected to the capacitor $C_{small}$ only. Since the capacitance of the capacitor $C_{small}$ is less than the capacitance of the capacitor $C_2$, the amplitude of the signal input to the rectifier may be increased. A width of the increased amplitude may be adjusted based on the capacitance of the capacitor $C_{small}$. When the fourth switch unit 1050 is powered on, the power stored in the target resonator 1010 is transferred to the battery through the rectifier and the regulator.

Referring to FIG. 10B, in an interval in which the first switch unit 1020 is in an on state, and in which each of the second switch unit 1030 and the third switch unit 1040 are in an off state, a mutual resonance between the target resonator 1010 and the source resonator occurs. When the second switch unit 1030 and the third switch unit 1040 are powered on, and when the target resonator 1010 is connected to the capacitors $C_{Large}$ and $C_{small}$, the resonant frequency of the target resonator 1010 is changed. The second switch unit 1030 and the third switch unit 1040 are powered on at a time 1060 in which the mutual resonance occurs. Due to the connection between the capacitors $C_{Large}$ and $C_{small}$ and the target resonator 1010, the resonant frequency of the target resonator 1010 is reduced, and a period of the mutual resonance is lengthened as indicated by a block 1080.

At a time 1070 in which the voltage $V_C$ measured in the capacitor $C_2$ includes a minimum value, the first switch unit 1020 is powered off. When the first switch unit 1020 is powered off, the capacitor $C_2$ and the inductor $L_2$ are disconnected from each other.

In an example, when the first switch unit 1020 and the second switch unit 1030 are powered off at the time 1070, an amplitude of a signal output from the target resonator 1010 is amplified as indicated in the block 1080. When the second switch unit 1030 is powered off, the inductor $L_2$ is disconnected from the capacitor $C_{Large}$. Accordingly, the inductor $L_2$ is connected to the capacitor $C_{Small}$ only.

In another example, when the fourth switch unit 1050 is powered on at the time 1070, the target resonator 1010 is connected to the rectifier, and the power stored in the target resonator 1010 is transferred to the battery through the rectifier and the regulator. That is, the wireless power receiver performs charging of the battery.

FIG. 10C illustrates an example of an operation of each of the first switch unit 1020, the second switch unit 1030, the third switch unit 1040, and the fourth switch unit 1050 that is performed when the mutual resonance occurs in a state in which the capacitors $C_2$ and $C_{Small}$ are connected in parallel to the inductor $L_2$. For example, FIG. 10B illustrates an example in which the capacitance of the capacitor $C_2$ is 1 nF, and FIG. 10C illustrates an example in which a capacitance of both of the capacitors $C_2$ and $C_{small}$ is 0.5 nF.

Referring to FIG. 10C, in an interval in which the first switch unit 1020 and the third switch unit 1040 are powered on, the mutual resonance between the target resonator 1010 and the source resonator occurs. When the second switch unit 1030 is powered on, and when the target resonator 1010 is connected to the capacitor $C_{Large}$, the resonant frequency of the target resonator 1010 is changed. For example, the second switch unit 1030 is powered on at a time 1085 in which the mutual resonance occurs. Due to the connection between the capacitor $C_{Large}$ and the target resonator 1010, the resonant frequency of the target resonator 1010 is decreased, and a period of the mutual resonance is lengthened.

When the first switch unit 1020 is powered off at a time 1090 in which the voltage $V_C$ measured in the capacitor $C_2$ includes the minimum value, the capacitor $C_2$ and the inductor $L_2$ are disconnected from each other. When the second switch unit 1030 is powered off at the time 1090, the inductor $L_2$ is disconnected from the capacitor $C_{Large}$. In other words, when the first switch unit 1020 and the second switch unit 1030 are powered off, the inductor $L_2$ is connected to the capacitor $C_{small}$ only.

A capacitance of the wireless power receiver is increased from the capacitance of the capacitors $C_2$ and $C_{small}$ to the capacitance of the capacitor $C_{Large}$, and is decreased to the capacitance of the capacitor $C_{small}$. Accordingly, the amplitude of the signal output from the target resonator 1010 is amplified. Subsequently, when the fourth switch unit 1050 is powered on, the target resonator 1010 is connected to the rectifier, and the power stored in the target resonator 1010 is transferred to the battery through the rectifier and the regulator.

Figure 11:
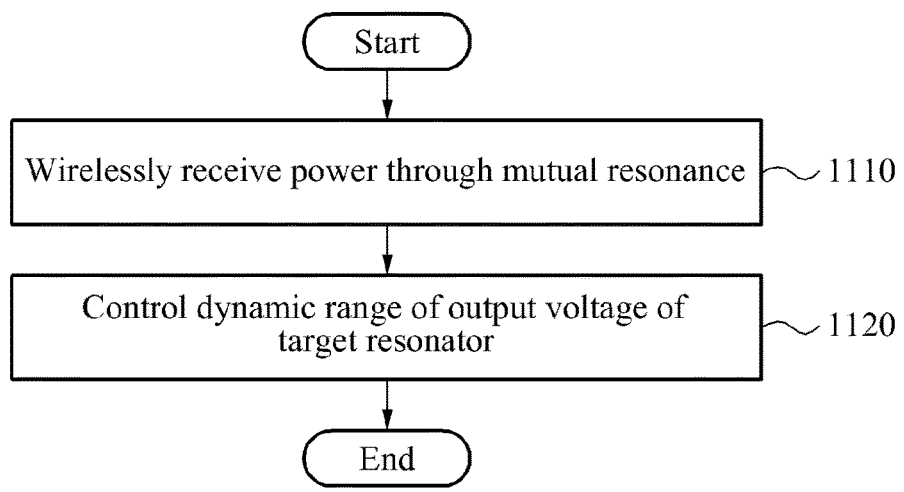
FIG. 11 is a flowchart illustrating an example of a wireless power reception method.

FIG. 11 illustrates an example of a wireless power reception method. In operation 1110, a wireless power receiver wirelessly receives power through a mutual resonance between a source resonator of a wireless power transmitter and a target resonator of the wireless power receiver.

In operation 1120, the wireless power receiver connects the target resonator to one or more capacitors, such as a first capacitor and/or a second capacitor, to control a dynamic range of an output voltage of the target resonator. The first capacitor may include a capacitance greater than or equal to a capacitance of a capacitor included in the target resonator, and a second capacitor may include a capacitance less than the capacitance of the capacitor included in the target resonator. The output voltage of the target resonator may include the same magnitude as a voltage input to a rectifier connected to a rear end of the target resonator.

To attenuate the output voltage of the target resonator, the wireless power receiver may control a timing in which the first capacitor and/or the second capacitor are connected to the target resonator. To amplify the output voltage of the target resonator, the wireless power receiver may control a timing in which the second capacitor is connected to the target resonator.

The examples of a wireless power receiver described may amplify or attenuate an amplitude of a received signal including a large dynamic range due to a mobility of a wireless power transmitter or the wireless power receiver, using a passive device. Thus, it is possible to increase a charging efficiency and a signal conversion efficiency. Additionally, the wireless power receiver may adjust the dynamic range of the received signal, using the passive device, and thus, it is possible to stably supply power to a battery and/or a digital chip. Furthermore, the wireless power receiver may adjust a timing in which a target resonator is connected to, e.g., a capacitor including a capacitance less than a capacitor in the target resonator, and a capacitor including a capacitance greater than the capacitor in the target resonator. Thus, it is possible to efficiently capture power stored in the target resonator.

The various units and methods described above may be implemented using one or more hardware components, one or more software components, or a combination of one or more hardware components and one or more software components.

A hardware component may be, for example, a physical device that physically performs one or more operations, but is not limited thereto. Examples of hardware components include microphones, amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may include various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions that control a processing device to implement a software component may include a computer program, a piece of code, an instruction, or some combination thereof, that independently or collectively instructs or configures the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments that implement the examples disclosed herein can be easily constructed by a programmer skilled in the art to which the examples pertain based on the drawings and their corresponding descriptions as provided herein.

As a non-exhaustive illustration only, a device described herein may be a mobile device, such as a cellular phone, a personal digital assistant (PDA), a digital camera, a portable game console, an MP3 player, a portable/personal multimedia player (PMP), a handheld e-book, a portable laptop PC, a global positioning system (GPS) navigation device, a tablet, a sensor, or a stationary device, such as a desktop PC, a high-definition television (HDTV), a DVD player, a Blue-ray player, a set-top box, a home appliance, or any other device known to one of ordinary skill in the art that is capable of wireless communication and/or network communication.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A wireless power receiver, comprising:
   a receiving unit configured to wirelessly receive power through a resonance between a source resonator and a target resonator; and
   a control unit configured to control an electrical connection between the target resonator and at least one capacitor disposed in the wireless power receiver,
   wherein the control unit electrically connects the target resonator with the at least one capacitor and electrically connects the target resonator with a rectifier, and
   in response to the target resonator being electrically connected with each of the at least one capacitor and the rectifier, an amplitude of a voltage input to the rectifier is adapted.

2. The wireless power receiver of claim 1, wherein the at least one capacitor comprises a first capacitor comprising a capacitance greater than or equal to a capacitance of a capacitor of the target resonator, and a second capacitor comprising a capacitance less than the capacitance of the capacitor of the target resonator.

3. The wireless power receiver of claim 1, wherein the control unit is further configured to:
   connect the target resonator to the at least one capacitor to change a resonant frequency of the target resonator.

4. The wireless power receiver of claim 1, wherein the control unit comprises:
   a timing controller configured to
   control a first timing in which the at least one capacitor is connected to the target resonator, and
   control a second timing in which a capacitor of the target resonator is connected to an inductor of the target resonator.

5. The wireless power receiver of claim 4, wherein the timing controller is further configured to:
   control the first timing to attenuate the voltage output from the target resonator; and
   control the first and second timings to amplify the voltage output from the target resonator.

6. The wireless power receiver of claim 1, further comprising:
   a first switch unit configured to connect the target resonator to a load; and
   a second switch unit configured to connect the at least one capacitor to the target resonator in parallel between the target resonator and the load.

7. The wireless power receiver of claim 1, wherein:
   the at least one capacitor comprises a first capacitor and a second capacitor; and
   the wireless power receiver further comprises
   a first switch unit configured to connect the target resonator to a load,
   a second switch unit configured to connect the first capacitor to the target resonator in parallel between the target resonator and the load, and
   a third switch unit configured to connect the second capacitor to the target resonator in parallel between the load and the first capacitor.

8. The wireless power receiver of claim 7, wherein the first switch unit is between the second capacitor and the load.

9. The wireless power receiver of claim 8, further comprising:
   a default capacitor configured to change a resonant frequency of the target resonator, the default capacitor being between the first switch unit and the load.

10. The wireless power receiver of claim 1, further comprising:
    a first switch unit configured to disconnect a capacitor of the target resonator from an inductor of the target resonator in response to a voltage of the capacitor of the target resonator being less than or equal to a predetermined value;
    a second switch unit configured to connect the target resonator to the at least one capacitor in parallel between the target resonator and a load to change a resonant frequency of the target resonator; and
    a third switch unit configured to connect the target resonator to the load.

11. The wireless power receiver of claim 1, further comprising:
    a first switch unit configured to disconnect a capacitor of the target resonator from an inductor of the target resonator in response to a voltage of the capacitor of the target resonator being less than or equal to a predetermined value;

a second switch unit configured to connect the target resonator to the at least one capacitor in parallel between the target resonator and a load during the resonance; and a third switch unit configured to connect the target resonator to the load.

12. The wireless power receiver of claim 1, wherein:

the at least one capacitor comprises a first capacitor and a second capacitor; and the wireless power receiver further comprises a first switch unit configured to disconnect a capacitor of the target resonator from an inductor of the target resonator in response to a voltage of the capacitor of the target resonator being less than or equal to a predetermined value, a second switch unit configured to connect the target resonator to the first capacitor in parallel between the target resonator and a load to change a resonant frequency of the target resonator, and disconnect the target resonator from the first capacitor in response to the voltage of the capacitor of the target resonator being less than or equal to the predetermined value, a third switch unit configured to connect the target resonator to the second capacitor in parallel between the load and the first capacitor to change the resonant frequency of the target resonator, and a fourth switch unit configured to connect the target resonator to the load.

13. The wireless power receiver of claim 1, wherein:

the at least one capacitor comprises a first capacitor and a second capacitor; and the wireless power receiver further comprises a first switch unit configured to disconnect a capacitor of the target resonator from an inductor of the target resonator in response to a voltage of the capacitor of the target resonator being less than or equal to a predetermined value, a second switch unit configured to connect the target resonator to the first capacitor in parallel between the target resonator and a load to change a resonant frequency of the target resonator, and disconnect the target resonator from the first capacitor in response to the voltage of the capacitor of the target resonator being less than or equal to the predetermined value, a third switch unit configured to connect the target resonator to the second capacitor in parallel between the load and the first capacitor during the resonance, and a fourth switch unit configured to connect the target resonator to the load.

14. A wireless power receiver, comprising:

a receiving unit configured to wirelessly receive power through a resonance between a source resonator and a target resonator; and a control unit configured to control an electrical connection between the target resonator and a passive device disposed in the wireless power receiver, wherein the control unit electrically connects the target resonator with the passive device and electrically connects the target resonator with a rectifier, and wherein in response to the target resonator being electrically connected with each of the passive device and the rectifier, an amplitude of a voltage input to the rectifier is adapted.

15. The wireless power receiver of claim 14, wherein the passive device comprises a first capacitor comprising a capacitance greater than or equal to a capacitance of a capacitor of the target resonator, and/or a second capacitor comprising a capacitance less than the capacitance of the capacitor of the target resonator.

16. The wireless power receiver of claim 15, wherein the control unit is further configured to:

connect the target resonator to the first capacitor and/or the second capacitor to attenuate the range.

17. The wireless power receiver of claim 15, wherein the control unit is further configured to:

connect the target resonator to the second capacitor, and disconnect the capacitor of the target resonator from an inductor of the target resonator, to amplify the range.

18. The wireless power receiver of claim 15, wherein the control unit is further configured to:

connect the target resonator to the first capacitor and the second capacitor during the resonance; and in response to a voltage of the capacitor of the target resonator being less than or equal to a predetermined value, disconnect the capacitor of the target resonator from an inductor of the target resonator, disconnect the target resonator from the first capacitor, and connect the target resonator to a load to transfer power stored in the target resonator to the load.

19. A wireless power reception method, comprising:

wirelessly receiving power through a resonance between a source resonator and a target resonator; and controlling a connection between the target resonator and at least one capacitor disposed in the wireless power receiver, and a connection between the target resonator and a rectifier, wherein in response to the target resonator being electrically connected with each of the at least one capacitor and the rectifier, an amplitude of a voltage input to the rectifier is adapted.

20. The wireless power reception method of claim 19, further comprising:

controlling a first timing in which the at least one capacitor is connected to the target resonator to attenuate the voltage output from the target resonator; and controlling the first timing and a second timing in which a capacitor of the target resonator is connected to an inductor of the target resonator to amplify the voltage output from the target resonator.

21. The wireless power receiver of claim 1, wherein the control unit is configured to control another electrical connection between the at least one capacitor and a rectifier simultaneously with the control of the electrical connection between the target resonator and at least one capacitor.

* * * * *